UNITED STATES PATENT OFFICE.

ERNST RUDOLFI, OF BERLIN-HALENSEE, GERMANY, ASSIGNOR TO L. ELKAN ERBEN GESELLSCHAFT M. B. H., OF BERLIN-WESTEND, GERMANY.

STABLE CARBONIC-ACID SOLUTION AND METHOD OF PRODUCING SAME.

1,247,334.     Specification of Letters Patent.     Patented Nov. 20, 1917.

No Drawing.     Application filed June 25, 1914. Serial No. 847,331.

*To all whom it may concern:*

Be it known that I, Dr. ERNST RUDOLFI, a subject of the Emperor of Germany, and residing at Berlin-Halensee, Germany, have invented certain new and useful Improvements in and Relating to Stable Carbonic-Acid Solutions and Methods of Producing Same, of which the following is a specification.

My invention relates to a process for the manufacture of carbonic acid waters for any purpose, for example for the manufacture of artificial carbonic acid solution, or carbonated water for general purposes, or for carbonic acid baths, in which the carbonic acid ($CO_2$) is absorbed to a large degree and in which the carbonic acid does not escape from the water as quickly as is the case with the ordinary commercial carbonic acid baths hitherto known.

I have found that by adding certain coloring matters derived from living organisms to the water, especially chlorophyl and hemoglobin and their derivatives, which in nature also exhibit the property of loosely retaining carbonic acid, the capacity of the water for absorbing carbon dioxid is substantially increased. It is immaterial, so far as the present invention is concerned, whether—as in nature—a loose retention of the carbonic acid by the coloring matter occurs, or whether other reasons for this phenomenon exist. It has been shown that the bath will hold an increased quantity of $CO_2$ in solution, when said coloring matters are added, over the quantity which would be held in solution by the same volume of water without the said coloring matters, at the same temperature.

In order to exactly ascertain whether water, in which carbonic acid is generated from equivalent quantities of sodium bicarbonate and tartaric acid, dissolves a larger quantity of carbonic acid after the addition of chlorophyl, experiments were made, (1) at room-temperature say about 18° C. and (2) at 34° C., both with and without the addition of chlorophyl. To 1000 cubic-centimeters of water 0.01 g. of chlorophyl were added.

*(1) Experiment at temperature of room.*

The quantity of carbonic acid contained in 1000 cc. amounted to:—

| Without chlorophyl. | With chlorophyl. |
|---|---|
| 1.67 g. | 2.14 g. |
| 1.86 " | 2.17 " |
| 1.92 " | 2.24 " |
| Average—1.82 g. | 2.18 g. |

The solubility of carbonic acid in water at room-temperature is consequently increased by 17–18%.

*(2) Experiments at 34° C.*

The experiments were made at three different intervals, viz. immediately after the temperature of 34° C. was attained, after 15 minutes and after 30 minutes.

(1). Immediately after 34° C. was reached:—

| Without chlorophyl. | With chlorophyl. |
|---|---|
| 1.40 g. | 1.95 g. |
| 1.39 " | 1.85 " |
| 1.53 " | 1.83 " |
| Average—1.44 g. | 1.88 g. |

The solubility of carbonic acid in water at 34° C. was therefore increased about 30% by the addition of chlorophyl.

(2). After 15 minutes:—

| Without chlorophyl. | With chlorophyl. |
|---|---|
| 0.72 g. | 1.04 g. |
| 0.54 " | 0.95 " |
| 0.63 " | 0.94 " |
| Average—0.63 g. | 0.98 g. |

The quantity of carbonic acid which remained for fifteen minutes in the water was therefore increased about 40% by the addition of chlorophyl.

(3). After 30 minutes:—

| Without chlorophyl. | With chlorophyl. |
|---|---|
| 0.49 g. | 0.60 g. |
| 0.55 " | 0.55 " |
| 0.58 " | 0.61 " |
|  | 0.60 " |
|  | 0.66 " |
|  | 0.60 " |
| Average—0.54 g. | 0.61 g. |

Although after 30 minutes the difference in the solubility (on account of the gas escaping to the atmosphere) was considerably smaller, the increase in the quantity of carbonic acid retained for thirty minutes, after the addition of the chlorophyl still amounted to 13%.

The expression "soluble coloring material which is a normal constituent of living cells and which has the property of loosely combining with carbon dioxid" as used in some of the appended claims is intended to cover both hemoglobin and chlorophyl, as well as derivatives of either of these, and equivalents thereof.

The use of hemoglobin is not specifically claimed herein, although included within the scope of some of the appended claims. Such use is specifically claimed in my application being a division hereof, Serial No. 196,288, filed October 12, 1917.

Having now described my invention what I claim as new and desire to secure by Letters Patent is:—

1. The herein described process of producing carbonated waters containing relatively large quantities of carbonic acid, which comprises adding to an aqueous liquid, a soluble coloring material which is a normal constituent of living cells and which has the property of loosely combining with carbon dioxid, and thereafter causing carbon dioxid in relatively large amounts to be absorbed by said liquid.

2. The herein described process of producing carbonated waters containing relatively large quantities of carbonic acid, which comprises producing an aqueous liquid containing dissolved chlorophyl, and thereafter causing a relatively large amount of carbon dioxid to be absorbed by said liquid.

3. The herein described process of producing carbonated waters containing relatively large quantities of carbonic acid, which comprises dissolving in an aqueous liquid, a chlorophyl derivative, causing carbon dioxid to be absorbed by said liquid.

4. The herein described product comprising a large amount of carbon dioxid dissolved in an aqueous liquid containing in solution a soluble coloring material which is a normal constituent of living cells, and which has the property of loosely combining with carbon dioxid.

5. The herein described product comprising a large amount of carbon dioxid dissolved in an aqueous solution containing chlorophyl.

In testimony whereof I have signed my name to this specification in the presence of two subscribing witnesses.

Dr. ERNST RUDOLFI.

Witnesses:
Henry Hasper,
Woldemar Haupt.